United States Patent
Willerton et al.

(10) Patent No.: US 8,527,074 B2
(45) Date of Patent: Sep. 3, 2013

(54) SENSOR ARRANGEMENT, PARTICULARLY FOR A PASSENGER PROTECTION SYSTEM OF A MOTOR VEHICLE

(75) Inventors: Mark Willerton, Vadstena (SE); Richard Baur, Pfaffenhofen (DE); Stephan Muhr, Munich (DE); Klaus Achatz, Gilching (DE)

(73) Assignee: Autoliv Development AB, Vårgårda (SE)

( * ) Notice: Subject to any disclaimer, the term of this patent is extended or adjusted under 35 U.S.C. 154(b) by 400 days.

(21) Appl. No.: 12/919,343

(22) PCT Filed: Feb. 3, 2009

(86) PCT No.: PCT/EP2009/000697
§ 371 (c)(1),
(2), (4) Date: Nov. 24, 2010

(87) PCT Pub. No.: WO2009/106207
PCT Pub. Date: Sep. 3, 2009

(65) Prior Publication Data
US 2011/0066333 A1 Mar. 17, 2011

(30) Foreign Application Priority Data
Feb. 26, 2008 (DE) .......................... 10 2008 011 165

(51) Int. Cl.
*G05D 1/00* (2006.01)
*G05D 3/00* (2006.01)

(52) U.S. Cl.
USPC ..................................... 700/45; 700/1; 700/9

(58) Field of Classification Search
USPC ................... 700/1, 9, 45; 340/5.7, 522, 566, 340/552
See application file for complete search history.

(56) References Cited

U.S. PATENT DOCUMENTS
4,836,024 A * 6/1989 Woehrl et al. ................ 307/10.1
4,975,850 A * 12/1990 Diller ............................. 701/45
(Continued)

FOREIGN PATENT DOCUMENTS
DE 38 11 217 A1 10/1989
DE 196 46 026 A1 5/1998
(Continued)

OTHER PUBLICATIONS
PCT/EP2009/000697—International Search Report—May 19, 2009.
(Continued)

*Primary Examiner* — Ian Jen
(74) *Attorney, Agent, or Firm* — Brinks Hofer Gilson & Lione

(57) ABSTRACT

A sensor arrangement, particularly for a passenger protection system of a motor vehicle, comprising a first group of sensors (10, 12) by means of which a first group of state parameters jointly usable by a first decision making unit connected downstream for detecting a first event can be detected, a first digital unit (20) coupled on the input side to at least one sensor (12) of the first sensor group. The arrangement processes the sensor output signals fed thereto and providing the same for forwarding to the first decision making unit as digital values. A second group of sensors (14, 16, 18), by means of which a second group of state parameters jointly useable by a second decision making unit is connected downstream for detecting a second event can be detected with a second digital unit coupled on the input side to at least one sensor (16, 18) of the second sensor group. The arrangement processes the sensor output signals fed thereto and providing the same for forwarding to the second decision making unit as digital values wherein at least one sensor (10) of the first sensor group is coupled to the second digital unit (22) and at least one sensor (14) of the second sensor group is coupled to the second digital unit (22) and at least one sensor (14) of the second sensor group is coupled to the first digital unit (20). The digital units (20, 22) are coupled on their output sides to a first and a second node (28, 30) combining the digital values.

9 Claims, 1 Drawing Sheet

(56) References Cited

U.S. PATENT DOCUMENTS

| | | | |
|---|---|---|---|
| 5,021,678 A * | 6/1991 | Diller | 307/10.1 |
| 5,173,614 A * | 12/1992 | Woehrl et al. | 307/10.1 |
| 5,544,915 A * | 8/1996 | Fendt et al. | 280/735 |
| 6,312,013 B1 * | 11/2001 | Baur et al. | 280/735 |
| 6,345,225 B1 * | 2/2002 | Bohm et al. | 701/70 |
| 6,410,993 B1 * | 6/2002 | Giers | 307/10.1 |
| 6,487,482 B1 * | 11/2002 | Mattes et al. | 701/45 |
| 7,734,395 B2 * | 6/2010 | Urbahn et al. | 701/45 |
| 7,996,132 B2 * | 8/2011 | Park | 701/46 |
| 8,014,922 B2 * | 9/2011 | Le et al. | 701/45 |
| 2001/0052730 A1 * | 12/2001 | Baur et al. | 307/10.1 |
| 2006/0055234 A1 * | 3/2006 | Choi et al. | 303/113.1 |
| 2006/0061464 A1 * | 3/2006 | Okada et al. | 340/459 |

FOREIGN PATENT DOCUMENTS

| | | |
|---|---|---|
| DE | 198 07 124 A1 | 9/1999 |
| DE | 102 35 567 A1 | 8/2002 |
| DE | 101 10 042 A1 | 10/2002 |
| DE | 103 21 679 B4 | 11/2006 |
| DE | 10 2006 036 861 A1 | 2/2007 |
| DE | 10 2006 009 372 A1 | 9/2007 |
| DE | 10 2006 024 666 A1 | 11/2007 |
| EP | 0 693 404 A1 | 1/1996 |
| WO | WO 02/055356 | 7/2002 |
| WO | WO 2005/080164 | 1/2005 |

OTHER PUBLICATIONS

PCT/EP2009/000697—International Preliminary Examination Report—Mar. 2, 2009.

* cited by examiner

SENSOR ARRANGEMENT, PARTICULARLY FOR A PASSENGER PROTECTION SYSTEM OF A MOTOR VEHICLE

CROSS REFERENCE TO ELATED APPLICATIONS

This application claims priority to German patent application number 10 2008 011 165.1, filed Feb. 26, 2008 and PCT/EP2009/000697, filed Feb. 3, 2009.

FIELD OF THE INVENTION

The present invention relates to a sensor arrangement (or system), particularly for a passenger protection system of a motor vehicle having a first group of sensors by means of which a first group of state parameters jointly usable by a decision-making unit connected downstream for detecting a first event can be detected, and a first digital unit coupled on the input side to sensors of the first group of sensors that processes the sensor output signals fed thereto and provides the same as digital values to be forwarded to the decision-making unit.

STATE OF THE ART

Arrangements of the above-mentioned type are in general known as so-called crash detection systems for motor vehicle occupant protection systems. The sensor groups normally comprise two acceleration sensors arranged to be sensitive to acceleration in directions perpendicular to one another, typically in the longitudinal and transverse direction of the vehicle. Signals from the acceleration sensors are sent to a digital unit which is used for digitizing analog sensor output signals, for example. The digitized data are then forwarded to a control device which decides on possible passenger protection measures to be taken, such as pretensioning seat belts or activating air bags.

Another form of accident detection system is known from DE 10 2006 009 372 A1. That document discloses a rollover detection system for a motor vehicle. In that case the system also consists of a group of sensors, particularly of a transverse acceleration sensor, which detects accelerations along the transverse axis of the vehicle, and a vertical acceleration sensor, which detects a vertical acceleration of the motor vehicle. A rotation rate sensor is additionally provided which detects rotation of the vehicle about its longitudinal axis (roll motion). The output signals of the acceleration sensors are fed into the digital unit where they are subjected to digital filtering and further processing and delivered to a control device on a common output line. In the known systems, data of the rotation rate sensor are directly fed into the control unit. In this case, the control device also decides possible passenger protection measures on the basis of the data fed into it.

A rollover detection system is known from DE 102 35 567 A1 which does without a rotation rate sensor and only makes a decision whether a rollover event exists on the basis of a measured vertical acceleration in connection with a longitudinal or transverse acceleration of the vehicle. With regard to a reliable definition of crash events, this system may, however, be considered to be suboptimal.

While a pure crash detection system is part of the standard equipment in modern vehicles, the rollover detection system is often an optional extra that can be purchased by the customer. Typically, the customer's request is met by installing an additional module comprising an additional sensor group and an additional sensor unit. The algorithmic system for processing the data of both sensor groups in a control device has to be correspondingly adapted. The latter is a substantial procedure because the algorithmic system for detecting simple crash events is relatively simple compared to the detection of two different events (crash and rollover), which additionally have to be reliably distinguished in each case in order to take the adequate passenger protection measures.

A particularly critical situation may arise if the information of one sensor group is not forwarded to the control device because of a component failure. Owing to the complex algorithmic system it is possible that even the sensor data of the remaining sensor group may be wrongly interpreted and the overall performance of the system may be worse than that of a system which is only geared to detecting crash events. The digital units, typically implemented by means of microcontrollers, should be considered as particularly critical because they represent a "bottleneck" in the data flow.

The above-mentioned difficulties could, however, be avoided if, by upgrading the sensor system for the detection of two different events, the sensor data were sent via only one common microcontroller. This would enable the control device to reliably detect the failure of this part on the basis of the absence of any data. The result would, however, be an overall failure of the protection system, which is not desirable. In order to preserve the upgradeability, a multichannel microcontroller would have to be used in each basic version, i.e. only crash detection system, which, in case of upgrading to the rollover detection system, would have to be laboriously re-wired. This is a disadvantage in terms of production.

It is an object of the present invention to provide a sensor system for a motor vehicle which can be easily upgraded for the detection of an additional event and also provides high functional reliability even in case of component failure.

EXPLANATION OF THE INVENTION

The above mentioned object of the invention is attained in accordance with this invention by providing in addition to a first group of sensors, a second group of sensors by means of which a second group of state parameters jointly usable by the decision-making unit connected downstream for detecting a second event, can be detected.

The system further has a second digital unit coupled on the input side to sensors of the second group of sensors, which processes the sensor output signals fed thereto and provides the same as digital values to be forwarded to the decision-making unit.

In the sensor arrangement of this invention, at least one sensor of the first sensor group is coupled to the second digital unit, and at least one sensor of the second sensor group is coupled to the first digital unit, and the digital units are coupled on the output side to a first and a second node combining the digital values respectively fed into a first and a second output line such that the first node combines the digital values corresponding to the sensors of the first sensor group on the first output line and the second node combines the digital values corresponding to the sensors of the second sensor group on the second output line.

This invention includes interleaving the sensor data before the bottlenecks created by the digital units and a rearrangement of the sensor data before feeding them into the control device. According to the present invention, the sensor data arranged thematically, i.e. relative to one of the events to be detected, are thus split up and fed into different digital units. After the desired processing in the digital units, which can for example comprise the digitization of analog sensor data, the data are again combined in their thematic order and respectively encoded on the line to the control device allocated to each event to be detected. The control unit thus receives all state parameters relevant to the assessment of the event on event-specific inputs. Nonetheless, despite its key position as a "bottleneck", a failure of a digital unit does not result in an overall failure of the data flow to one of the events. The state parameters of both events are rather transferred incompletely which can in part be at least compensated by accurately choosing the interleaving method by using redundant information.

A preferred embodiment of this invention provides that the first sensor group comprises a longitudinal acceleration sensor for high acceleration components (of a level associated with the vehicle crash) acting along the longitudinal axis of the motor vehicle as well as a transverse acceleration sensor for high acceleration components along the transverse axis of the motor vehicle. These components are used in known crash detection systems.

The second sensor group preferably comprises a transverse acceleration sensor for low acceleration components (for example, of a level associated with rollover of the vehicle) acting along the transverse axis of the motor vehicle, a vertical acceleration sensor for low acceleration components along the vertical axis of the motor vehicle and a rotation rate sensor for the rotation of a motor vehicle about a perpendicular axis relative to its vertical axis. This corresponds to the design of a typical rollover detection system.

In such an arrangement of the sensor system, in which the crash detection system typically represents the basic detection system and the rollover detection system the optional additional detection system, the sensor of the second sensor group coupled to the first digital unit is preferably a rotation rate sensor. This means that the data of the rotation rate sensor, which may alone be basically—even if suboptimally—sufficient to detect a rollover event, are removed from their thematic order. The sensor of the first sensor group (crash detection sensors) coupled to the second digital unit is in turn advantageously its transverse acceleration sensor. This means that in the crash detection system (first sensor group) the data of the transverse acceleration sensor is removed from its thematic order. Thus, the data of the transverse acceleration sensor of the crash detection system are interleaved with the data of the rotation rate sensor of the rollover detection system (second sensor group) and fed into the respectively other digital unit for processing, particularly for digitization. After having been processed in the digital unit, all sensor data are again fed into their original thematic order via two nodes and to the control unit on two event-specific output lines. This has substantial advantages in case one of the digital units is damaged. If the first digital unit fails, for example, the data of the rotation rate sensor are transmitted to the control unit on the first output line, and the longitudinal acceleration data of the crash detection system are transmitted to the control device on the second output line. Most types of crash events and rollover events can thus be, even if suboptimally, detected. Conversely, in case of a failure of the second digital unit, the transverse and vertical acceleration data of the rollover detection system are transmitted on the first output line and the transverse acceleration data of the crash detection system are transmitted to the control device on the second output line. This is also sufficient, even if suboptimal, to detect most crash and rollover events.

The data are preferably encoded on event-specific output lines as a periodic sequence of the digital values fed into the respective node. In this case, a protocol, i.e. a predefined time sequence, known to the control device is conveniently used. In this way, the control device can identify the incoming data on the basis of their position in the periodic sequence. During the encoding process, data related to individual cases can be prioritized. It has thus turned out that the data of the vertical acceleration sensor and of the transverse acceleration sensor of the second sensor group, i.e. preferably of the rollover detection system, are temporally less critical than the data of the rotation rate sensor or the data of the transverse and/or longitudinal acceleration sensor of the first sensor group, i.e. preferably of the crash detection system. In a convenient further development of the present invention it has therefore been provided that the digital values corresponding to the transverse acceleration sensor and to the vertical acceleration sensor of the second sensor group are positioned within the periodic sequence in the same time slot and encoded alternately in consecutive periods. In other words, this means that in the preferred embodiment the data of the vertical acceleration sensor of the rollover detection system are encoded in the same position or phase of the period during an encoding period, and the data of the rollover detection system are encoded in the following period. The remaining data, which, as explained above, are more time critical, are transmitted with each period.

What special processing the sensor data are subjected to in the digital units can be chosen to a large extent by a person skilled in the art with regard to the special field of application. A typical processing method is the digitization of analog sensor signals. In a further development of the present invention, a threshold value can alternatively or additionally be compared to a predefined threshold value. In this embodiment, it may then be provided that the data sent on the event-specific output lines are 1-bit values which merely inform the control device that the corresponding sensor has detected that the upper or lower threshold value allocated to it was exceeded. In other embodiments, values at a higher bit depth can instead be transmitted to the control unit for further processing. In that embodiment, the threshold values can be compared in the control device.

BRIEF DESCRIPTION OF THE DRAWINGS

Further characteristics and advantages of the present invention will be apparent from the following, special description as well as from the drawings.
The drawings show.

DETAILED DESCRIPTION OF THE INVENTION

Figure 1:
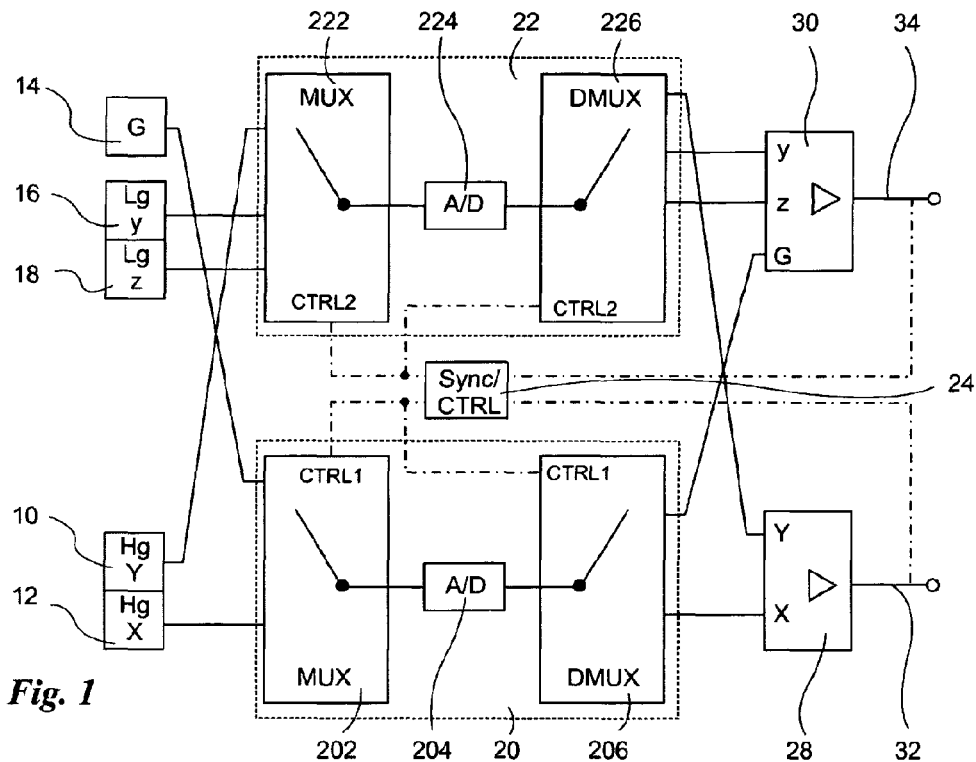
FIG. 1 is a schematic block diagram of a sensor system according to the present invention.

FIG. 1 shows a schematic block diagram of a preferred embodiment of a sensor system according to the present invention. The system consists of two modular component groups which each comprises a sensor group, a microcontroller and a node. The first component group essentially corresponds to a known crash detection system. The second component group essentially corresponds to a known rollover detection system. The present invention shows the advantageous combination of both component groups.

The first sensor group comprises a transverse acceleration sensor 10 for high accelerations along the transverse axis of the vehicle (HgY) as well as a longitudinal acceleration sensor 12 for high accelerations along the longitudinal axis of the vehicle (HgX). The second sensor group comprises a rotation rate sensor 14 for detecting the rotation of the vehicle about its longitudinal axis (roll motion G), a transverse acceleration sensor 16 for low accelerations along the transverse axis of the vehicle (Lgy) as well as a vertical acceleration sensor 18 for the detection of minor accelerations along the vertical axis of the vehicle (Lgz). The sensors of both groups are ordered thematically, i.e. the sensors that can jointly be used for the detection of an event (crash or rollover) are combined in one sensor group. This can be realized in the arrangement of all sensors of one sensor group in a common housing. In the present embodiment, the sensors 10 and 12 of the first sensor group belong to the crash detection system, while the sensors 14, 16 and 18 of the second sensor group belong to a rollover detection system.

A first digital unit, preferably a first microcontroller 20, as well as a second digital unit, preferably a second microcontroller 22, are connected downstream of the sensor groups. Three functional unit types, namely a multiplexer 202 or 222, an analog/digital converter 204 or 224 as well as a demultiplexer 206 or 226, are implemented in each of the microcontrollers 20 and 22, respectively. The functional units can be implemented in software, hardware or in a combination of software and hardware in the digital units 20 and 22. The inputs of the first multiplexer 202 are supplied with the sensor data of the longitudinal acceleration sensor 12 of the crash detection system as well as with the sensor data of the rotation rate sensor 14 of the rollover detection system. The inputs of the second multiplexer 222 are supplied with the sensor data of the transverse and vertical acceleration sensors 16 and 18 of the rollover detection system as well as with the sensor data of the transverse acceleration sensor 10 of the crash detection system. The analog sensor data directly available at the inputs of the multiplexers 202 and 222 are fed into A/D converters 204 and 224 at a clock rate predefined by a central clock pulse generator 24, where they are digitized at the required bit depth. From the demultiplexers 206 and 226 respectively connected downstream the digitized sensor data are led to outputs of the microcontrollers 20 and/or 22.

A first node 28 and a second node 30, which respectively output the digital data directly available at the node inputs on an allocated output line 32 and/or 34, are connected downstream of the microcontrollers 20 and 22. The output lines 32 and 34 are connected to a control device, which is not shown in detail, where further processing is carried out, and in particular a decision on passenger protection measures to be taken is made. The nodes 28 and 30 can be implemented as simple amplifiers or as summing units, where it should be noted that the data are not really added; instead, the demultiplexer 206 and 226 are clocked such that only one value is directly available at each node 28 and 30 for one time slot within an encoding period, while the other node inputs are connected to high-impedance microcontroller outputs.

At the inputs of the nodes 28 and 30 the thematic orders of the sensor groups on the input side are again restored. That is to say, the transverse and longitudinal acceleration data of the sensors 10 and 12 of the first sensor group are directly available at the inputs of the first node 28, while the transverse and vertical acceleration data as well as the rotation rate data of the sensors 14, 16 and 18 of the second sensor group are directly available at the inputs of the second node 30. These data are periodically encoded at always constant time slots on the event-specific output lines 32 and 34 according to a predefined protocol, and fed into event-specific inputs of the control device (generally a decision-making unit) which is not shown. In other words, the state parameters, which are optimally used for the detection of a crash event, are transmitted on the first output line 32, and the state parameters, which are optimally used for the detection of a rollover event, are transmitted on the second output line 34.

The twofold data interleaving of the present invention is clearly visible in FIG. 1. The data of the transverse acceleration sensor 10 of the crash detection system and the data of the rotation rate sensor 14 of the rollover detection system are thus removed from their thematic connection and processed in a microcontroller together with the data of the remaining sensors of each of the other sensor groups.

After having been processed, they are again interleaved and the separated data are fed back into event-specific nodes 28 and 30 and encoded on event-specific lines. This has the effect that none of the output lines 32 and 34 is completely "dead" in case of a failure of a microcontroller 20 or 22, but instead data which are still sufficient for detecting crash events as well as rollover events, and in particular for distinguishing both types of events, are sent to the control device on both lines 32 and 34. In the embodiment shown, the data of the transverse acceleration sensor 10 of the crash detection system are transmitted on the first output line 32 in case of a failure of the first microcontroller 20, and the data of the transverse and vertical acceleration sensors 16 and 18 of the rollover detection system are transmitted on the second output line 34. In case of a failure of the second microcontroller 22, the data of the longitudinal acceleration sensor 12 of the crash detection system are transmitted on the first output line 32 and the data of the rotation rate sensor 14 of the rollover detection system are transmitted on the second output line 34.

The sensor system of the present invention is characterized by a high modularity. It is therefore possible, for example, to provide only the first sensor group with the sensors 10 and 12, the first microcontroller 20 and the first node 28 with the first output line 32 in the basic version of a motor vehicle. The transverse acceleration sensor 10 would then be coupled to an input of the multiplexer 202 and the output of the demultiplexer 206 coupled to the second node 30 in FIG. 1 would be coupled to the input of the first node 28. In order to upgrade the system to an improved accident detection system with rollover detection the same circuit board could be populated with the additional microcontroller 22 and the additional node 30. The modified wiring according to FIG. 1 would be easy and simple to carry out. The other relevant programming of the control device would also be easy to accomplish. In particular, the costs of the components can thus be kept low because of the fewer number of channels required in each microcontroller, and in addition, improved reliability compared to two separate systems, or one system with a common, four-channel microcontroller for both event sensors is achieved.

Figure 2:
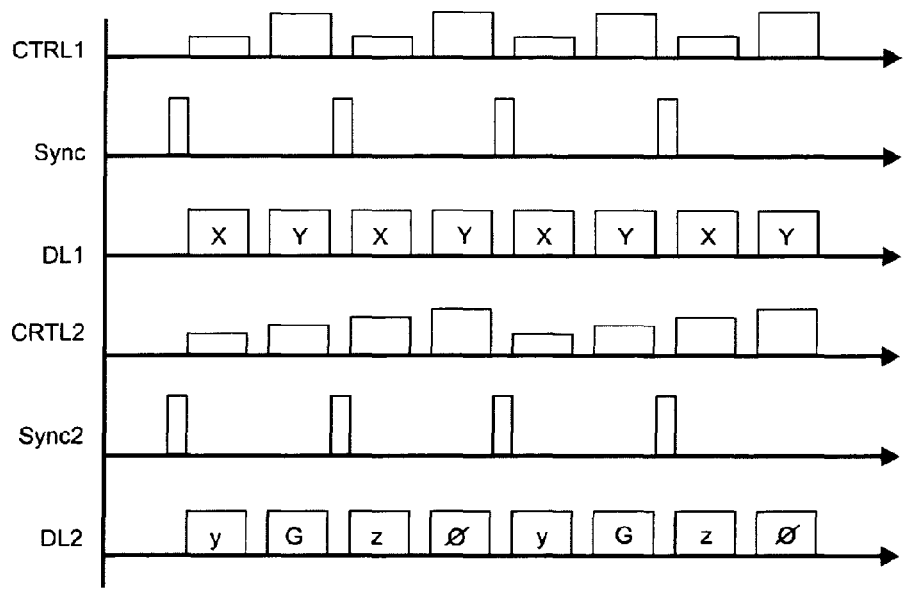
FIG. 2 is a diagram of the preferred timing of the sensor system of FIG. 1.

FIG. 2 shows a preferred embodiment of the timing of the sensor system illustrated above. The special forms and sequences of the synchronization pulses (Sync and Sync2) and/or of the control pulses (CTRL1 and CTRL2) are not required for the present invention. Tuning between analog sensor readouts, their digitization and multiplexing and/or demultiplexing can be optimized by the person skilled in the art with regard to the individual cases and the components employed. Encoding on the output lines 32 and 34, which is designated with DL1 and DL2 in the timing diagram of FIG. 2, is important for the illustrated embodiment of the present invention. Normally, the signal DL1, which alternately transmits the data allocated to the transverse and longitudinal acceleration sensors 10 and 12 (X and Y) of the crash detection system, is encoded on the first output line 32. The period of this encoding corresponds to the distance between the Sync pulses. The signal designated with DL2 on the timing diagram (y, G, z, φ), which has a period that is twice as long, is encoded on the output line 34. The transverse acceleration data of the sensor 16 and the rotation rate data of the sensor 14 are transmitted in a first half period, and the vertical acceleration data of the sensor 18 and a zero signal (φ) are transmitted in the second half period. This is easily possible because the state parameters that can be used for detecting a rollover event (y,z, G) are less time-critical than the state parameters for a crash detection system (X,Y).

Of course, the embodiments discussed in the special description and shown in the figures are only illustrative exemplary embodiments of the present invention. In the light of the present disclosure, the person skilled in the art is provided with a broad spectrum of possibilities of variation. In particular, the present invention is not restricted to the detection of crash and rollover events. The principle of the present invention can also be extended to more than two groups of sensors.

While the above description constitutes the preferred embodiment of the present invention, it will be appreciated that the invention is susceptible to modification, variation, and change without departing from the proper scope and fair meaning of the accompanying claims.

The invention claimed is:

1. A sensor arrangement, particularly for a passenger protection system of a motor vehicle, comprising:
   a first group of sensors, at least one of the sensors of the first group configured to measure a different property than other sensors of the first group, the first group of sensors measuring a first group of state parameters jointly usable by a first decision-making unit connected downstream of the first group of sensors for detecting a first event,
   a first digital unit coupled on an input side thereof to at least a first sensor of the first group of sensors, the first digital unit processing sensor output signals fed thereto and providing digital values to be forwarded to the first decision-making unit,
   a second group of sensors, the second group of sensors including at least one sensor measuring a property not measured by any sensor of the first group of sensors, at least one of the sensors of the second group configured to measure a different property than other sensors of the second group, the second group of sensors measuring a second group of state parameters jointly usable by a second decision-making unit connected downstream of the second group of sensors for detecting a second event different than the first event,
   a second digital unit coupled on an input side thereof to at least a first sensor of the second group of sensors, the second digital unit processing sensor output signals fed thereto and providing digital values to be forwarded to the second decision-making unit,
   wherein at least a second sensor of the first group of sensors is coupled to the second digital unit and at least a second sensor of the second group of sensors is coupled to the first digital unit,
   wherein the second sensor of the second group is not coupled to the second digital unit and the second sensor of the first group is not coupled to the first digital unit, and
   wherein the first and second digital units are coupled on output sides thereof to a first and a second node combining the digital values respectively fed into a first and a second output line such that the first node combines the digital values corresponding to the first and second sensor of the first group of sensors on the first output line and the second node combines the digital values corresponding to the first and second sensors of the second group of sensors on the second output line.

2. The sensor arrangement according to claim 1 further comprising that the first group of sensors comprises a longitudinal acceleration sensor for high acceleration components along the longitudinal axis of the motor vehicle as well as a transverse acceleration sensor for high acceleration components along the transverse axis of the motor vehicle.

3. The sensor arrangement according to claim 2 further comprising that the second group of sensors comprises a transverse acceleration sensor for low acceleration components along the transverse axis of the motor vehicle, a vertical acceleration sensor for low acceleration components along the vertical axis of the motor vehicle and a rotation rate sensor for rotation of the motor vehicle about an axis that is perpendicular to its vertical axis (G).

4. The sensor arrangement according to claim 3, further comprising that the second sensor of the second group of sensors coupled to the digital unit is a rotation rate sensor.

5. The sensor arrangement according to claim 4, further comprising that the second sensor of the first group of sensors coupled to the second digital unit is a transverse acceleration sensor.

6. The sensor arrangement according to claim 1, further comprising that encoding on the first and second output lines is accomplished as a periodic sequence of the digital values fed into each of the first and second nodes.

7. The sensor arrangement according to claim 5, further comprising that the digital values corresponding to the transverse acceleration sensor and to the vertical acceleration sensor of the second group of sensors are positioned within the periodic sequence in the same time slot and are encoded alternately in successive periods.

8. The sensor arrangement according claim 1, further comprising that the processing of signals of at least one of the sensors by at least one of the digital units comprises digitization of analog sensor output signals.

9. The sensor arrangement according to claim 1, further comprising that the processing of at signals of at least one of the sensors in at least one of the digital units comprises a comparison to a predefined threshold value and the generation of a corresponding 1-bit digital value.

* * * * *

UNITED STATES PATENT AND TRADEMARK OFFICE
CERTIFICATE OF CORRECTION

PATENT NO.       : 8,527,074 B2
APPLICATION NO.  : 12/919343
DATED            : September 3, 2013
INVENTOR(S)      : Willerton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 490 days.

Signed and Sealed this
Fifteenth Day of September, 2015

Michelle K. Lee
*Director of the United States Patent and Trademark Office*